March 22, 1960
J. R. PHILLIPS
2,929,517
STABILIZER ASSEMBLY FOR HEAVY
CONSTRUCTION EQUIPMENT
Filed June 10, 1957
2 Sheets-Sheet 1
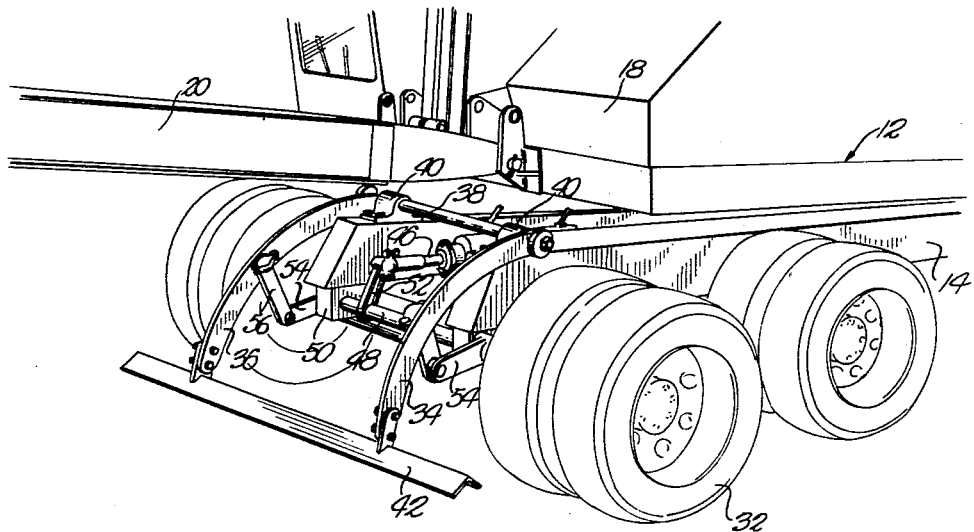
Fig. 1.
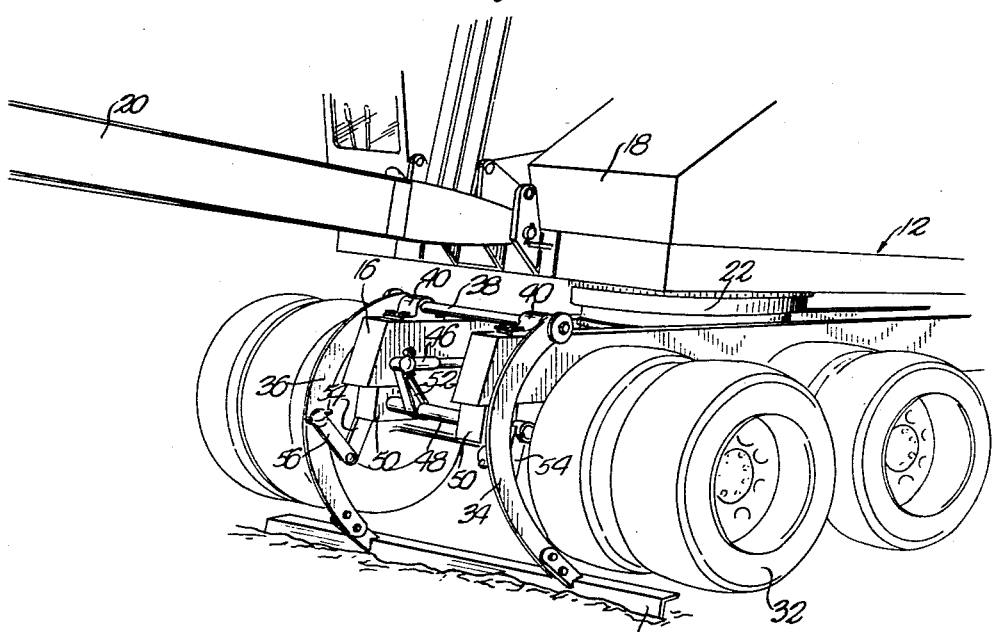
Fig. 2.
INVENTOR.
John R. Phillips
BY 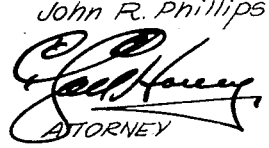
ATTORNEY March 22, 1960 J. R. PHILLIPS 2,929,517
STABILIZER ASSEMBLY FOR HEAVY CONSTRUCTION EQUIPMENT
Filed June 10, 1957 2 Sheets-Sheet 2

INVENTOR.
John R. Phillips
BY
ATTORNEY

United States Patent Office 2,929,517
Patented Mar. 22, 1960

2,929,517

STABILIZER ASSEMBLY FOR HEAVY CONSTRUCTION EQUIPMENT

John R. Phillips, Shawnee, Kans.

Application June 10, 1957, Serial No. 664,545

6 Claims. (Cl. 212—145)

This invention relates to stabilization apparatus particularly adapted for heavy construction equipment and, more specifically, to a novel outrigger assembly which is adapted to be pivotally mounted on one end of the equipment and which is swingable to a position stabilizing the machinery during the use thereof.

Wheeled heavy construction equipment having a swingable boom thereon has been known and utilized for many years and the same is particularly advantageous because of the mobility thereof, but a problem has been presented due to the fact that the equipment is not sufficiently stable during working movements of the boom because of the insufficient contact of the equipment with the ground and thereby permitting a considerable amount of movement of the equipment with respect to the ground during construction operations. It can be readily ascertained that the problem is magnified when the wheel structure supporting the equipment consists of rubber tires mounted on suitable truck assemblies and which are necessarily suspended from the undercarriage of the equipment by suitable spring means.

Attempts have been made to solve this problem by providing outrigger assemblies attached to the equipment and which are adapted to be brought into firm engagement with the ground, but these outriggers have not been successful for several important reasons, one of the most important being the fact that the outrigger extends a considerable distance beyond the frame of the equipment and thereby interferes with swinging movement of the boom, especially when the latter has a back hoe shovel or other similar attachments thereon and the equipment is being utilized to dig a relatively deep trench, whereby extreme difficulty is encountered in digging a deep ditch because of the boom engaging the outwardly extending outrigger assembly.

It is therefore the most important object of this invention to provide stabilization apparatus for construction equipment having a vertically swingable boom wherein an outrigger assembly is pivotally mounted on one end of the frame of the equipmnet and has an elongated, ground engaging cross member on the lowermost end thereof, which is adapted to be swung to a position engaging the ground and clearing the boom when the latter is swung downwardly thereover to a location proximal to one end of the equipment so that the member does not interfere in any manner with vertical swinging movement of the boom.

A very important object of this invention is to provide an outrigger assembly which is adapted to be pivotally mounted on the construction equipment so that the same may be moved into and out of engagement with the ground and therefore, need not be removed when the equipment is moved to another location.

Another important object of this invention is to provide such stabilization apparatus wherein the assembly is swingable to a position with the cross member engaging the ground and disposed below one end of the equipment in a manner so as to not in any way interfere with vertical swinging movement of the operating boom.

An additional important object is to provide stabilization apparatus including an outrigger assembly wherein the assembly is swingable by virtue of power operated mechanism to a position engaging the ground beneath one end of the equipment in a position so as to hold the adjacent end of the equipment off of the ground and supported on the assembly.

Another important object is to provide stabilization apparatus wherein a piston and cylinder assembly is located on the frame of the equipment and which is attached to the outrigger assembly by the medium of a crank so as to impart an effective mechanical advantage to the movement of the outrigger from an inoperative to an operative position below one end of the equipment.

A further important object of this invention is to provide an outrigger assembly as disclosed above wherein the crank includes an upright projection pivotally attached to the piston of the hydraulic cylinder, and laterally extending extensions which are pivotally connected to the assembly structure in a manner so that the projection and piston are disposed at substantially right angles at the moment the cross member of the outrigger assembly initially engages the ground so as to assure a perpendicular force vector to the crank at the time the cross member engages the ground.

Other important objects of this invention relate to the way in which the outwardly extending arms of the outrigger assembly are outwardly bowed so that the cross member may be moved beneath one end of the equipment to clear the boom as the latter is swung downwardly to its lowermost position; to the provision of a V-shaped cross member which is positioned so that one leg of the member digs into the ground and firmly holds the equipment against movement during operation of the boom, and thereby permitting more efficient pay loads to be carried by the boom; and to other, less important objects which will become obvious or be explained more fully in detail as the following specification progresses.

In the drawings:

Figure 1 is a fragmentary, perspective view taken slightly above and to one side of heavy construction equipment having an outrigger assembly made in accordance with the concepts of the instant invention pivotally mounted thereon;

Fig. 2 is a perspective view similar to Fig. 1 and showing the outrigger assembly swung downwardly to a position with the cross member thereof engaging the ground and holding one end of the assembly off the ground;

Figure 3:
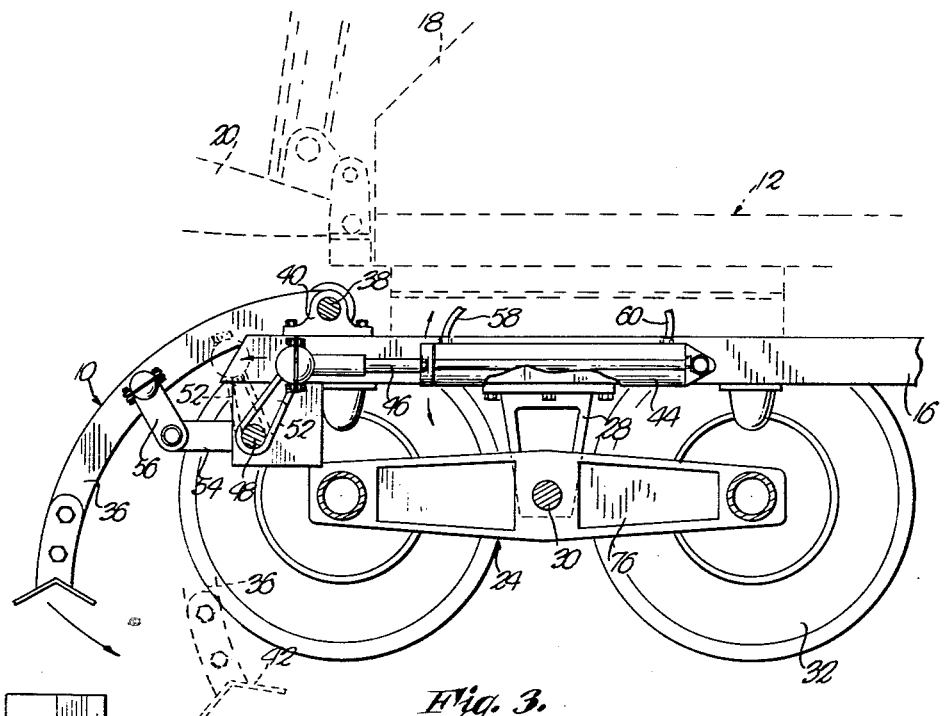
Figure 4:
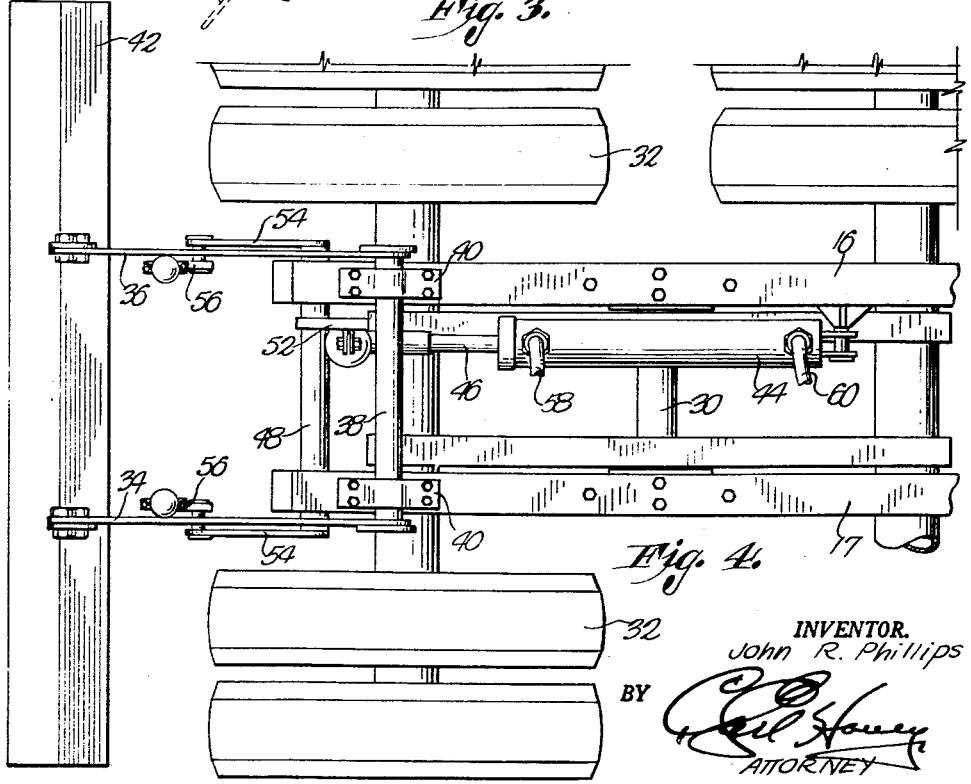

Fig. 3 is a vertical, central, median, cross-sectional view through the instant outrigger assembly and the construction equipment upon the which the same is mounted, certain parts being broken away to show details of construction and other parts thereof, as well as another position of the outrigger assembly being shown in phantom; and Fig. 4 is a top plan view of the instant invention with the boom and means for operating the same being removed from the frame of the equipment to reveal details of construction.

As indicated, an outrigger assembly broadly designated by the numeral 10 is adapted to be pivotally mounted on one end of construction equipment designated 12 and which includes a pair of elongated, spaced, parallel frame members 14 and 16. Equipment 12 includes a machinery deck 18 having an elongated, swingable boom 20 mounted thereon and operably connected by suitable mechanism to a prime mover within deck 18 on frame members 14 and 16, deck 18 being supported on a turntable 22 so that the boom 20 may be swung on a vertical axis as well as a horizontal one. Wheel and axle structure for supporting the end of equipment 12 below machinery deck 18 may comprise a wheel truck 24 on the outermost sides of frame members 14 and 16 respectively. Truck 24 comprises an elongated bar 26 which is pivotally mounted on a bracket 28 by virtue of a shaft 30 spanning the distance between frame members 14 and 16, and a pair of rubber tired wheels 32 are pivotally mounted on the opposed outermost ends of bar 26. As clearly shown in Figs. 3 and 4, brackets 28 are suitably secured to the lowermost faces of frame members 14 and 16 respectively so that the weight of machinery 18 is disposed on wheels 32.

Outrigger assembly 10 includes a pair of spaced, substantially parallel, arcuate arms 34 and 36 respectively and which are pivotally attached to the outermost ends of frame members 14 and 16 respectively by virtue of an elongated shaft 38 spanning frame members 14 and 16. Shaft 38 is journalled in suitable bearings 40 secured to the uppermost faces of frame members 14 and 16 respectively, and the uppermost ends of each of the arms 34 and 36 are pivotally connected to the outermost ends of shaft 38.

An elongated, substantially V-shaped cross member 42 is secured to the lowermost end of arms 34 and 36 respectively and is adapted to engage the ground as assembly 10 is swung downwardly with respect to frame members 14 and 16 respectively. A hydraulic cylinder 44 is secured to frame member 16 by suitable means and includes a piston (not shown) having a piston rod 46 attached thereto and extending outwardly of cylinder 44 toward the rear of equipment 12. A crankshaft 48 is also pivotally mounted on the rearmost ends of frame members 14 and 16 through the medium of a cubical bearing 50 on each of the frame members 14 and 16. A projection 52 is suitably secured to crankshaft 48 by welding or the like and normally extends upwardly therefrom, and a pair of extensions 54 are rigidly secured to the outermost opposed ends of crankshaft 48 located outwardly from bearings 50. Also, links 56 interconnect the outermost ends of each of the extensions 54 and a corresponding arm 34 and 36 respectively and are pivotal with respect to the arm 34 or 36 and an extension 54. It is of further note that the uppermost end of projection 52 is pivotally connected by suitable means to the outermost end of extensible rod 46.

It is also contemplated that cylinder 44 be of the double-acting type and in this connection, suitable conduits 58 and 60 respectively communicate with opposite ends of cylinder 44 and lead to a suitable source of hydraulic pressure.

In operation, and as shown in Figs. 1 and 3, when it is desired to move equipment 12 to a working area, outrigger assembly 10 is normally disposed in an inoperative, ground clearing position with the piston contained in cylinder 44 at the innermost end of its path of travel so that piston rod 46 is telescoped within cylinder 44. In this position of outrigger assembly 10, cross member 42 clears the ground and the assembly 10 need not be removed from equipment 12 while the same is being moved from one location to another.

After equipment 12 has been moved to a point where it is desired to use the same, hydraulic pressure is applied to conduit 60 so as to direct hydraulic pressure into cylinder 44 and move the piston therein toward the rearmost end of frame members 14 and 16 respectively and thereby move piston rod 46 outwardly toward the rear of equipment 12. Rearward movement of rod 46 swings projection 52 about the axis of shaft 48, thus rotating shaft 48 and in turn, extensions 54 thereon which, through links 56, pull arms 34 and 36 respectively toward the undercarriage of equipment 12. As soon as cross member 42 engages the ground, continued swinging movement of arms 34 and 36 respectively beneath the rear ends of frame members 14 and 16 respectively causes the rearmost end of equipment 12 to be moved upwardly and thereby shift the weight of the rear end of equipment 12 on the outrigger assembly 10 rather than on the wheels 32. Although the perspective view in Fig. 2 shows four of the wheels 32 as being disposed on the ground, it is recognized that none of the weight of equipment 12 is disposed on these forward wheels 32 because of the fact that the bars 26 rotate about shaft 30 and therefore, the forward wheels 32 ordinarily remain on the ground while the rear wheels 32 are disposed off the ground. Manifestly, this disposition of the wheels might be reversed if equipment 12 was being operated in an area where the ground sloped sharply to the rear, therefore causing the rearward wheels 32 to engage the ground whereas the forward wheels 32 would be disposed in the air. Obviously the disposition of wheels 32 is of no importance because all of the weight of the rear end of equipment 12 is disposed on outrigger assembly 10.

It should also be pointed out that one leg of cross member 42 ordinarily digs into the ground so as to form a firm support for equipment 12 and prevent any movement of the construction equipment with respect to the ground during operation of boom 20. Another important fact relates to the way in which cross member 42 is disposed below the rearmost end of frame members 14 and 16 respectively when assembly 10 has been swung to the lowermost point of its path of travel so as not to interfere with vertical swinging movement of boom 20 in any way whatsoever. It can be appreciated that when a shovel such as a back hoe is attached to boom 20 and the latter is being utilized to dig a deep trench, it is desirable that boom 20 be swung downwardly to the lowermost end of its path of travel substantially proximal to the rear end of equipment 12 so as to negate the necessity of moving equipment 12 at frequent intervals. Previously known outrigger assemblies utilizing cross members have interfered with movement of boom 20 to the lowermost end of its path of travel and therefore, necessitated movement of equipment 12 at more frequent intervals than is necessary with the instant assembly 10.

Another important feature of this invention relates to the fact that projection 52 is disposed at an angle of substantially 120° with respect to extensions 54 and, also, the crank structure is so arranged that the projection 52 is located at a substantial right angle to piston rod 46 at the moment cross member 42 initially engages the ground, to thereby effect more efficient mechanical advantage from the component parts of the structure. In this way, it can be seen that because of the fact that projection 52 and piston rod 46 are disposed at right angles at the time cross member 42 engages the ground, the force vector from piston rod 46 is perpendicular to projection 52 and there is no loss of mechanical advantage as the rear end of equipment 12 is forced up and onto the lowermost end of outrigger assembly 10. The outermost end of rod 46 is preferably adjustably secured to the upper end of projection 52 so that the necessary relationships of the parts may be maintained, irrespective of the terrain encountered and also, so as to be mountable on various pieces of construction equipment which might vary slightly with respect to the distance of frame members 14 and 16 from the ground.

The outrigger assembly herein disclosed is of relatively simple construction, the parts are extremely durable and do not break down under heavy stress, and may be placed in position on existing construction equipment at a minimum of cost and time.

Having thus described the invention what is claimed as new and desired to be secured by Letters Patent is:

1. In stabilization apparatus for mobile construction equipment having a frame, supporting wheel structure adjacent opposed ends of the frame and a vertically swingable boom carried by the frame: an outrigger assembly including a pair of downwardly extending, spaced, parallel arms adapted to be pivotally mounted directly on the frame adjacent the end thereof proximal to the boom and an elongated, horizontal, ground engaging, cross member attached to the lowermost ends of the arms, each of said arms being arcuate in configuration and bowed outwardly from said one end of the frame; and means adapted to be secured to the equipment and connected with said arms for swinging the latter to a position with said member engaging the ground, the end of the equipment proximal to the boom lifted off the ground and supported on said assembly, and said member clearing the boom when the latter is swung downwardly over the member to a location proximal to said one end of the frame.

2. In stabilization apparatus for mobile construction equipment including an elongated undercarriage, supporting wheel structure adjacent opposed ends of the undercarriage and a vertically swingable boom carried by the undercarriage: an outrigger assembly including a pair of arcuate, downwardly extending, spaced, parallel arms adapted to be pivotally mounted directly on one end of the undercarriage adjacent the end thereof proximal to the boom and an elongated, horizontal, ground engaging, cross member attached to the lowermost ends of the arms; power means adapted to be secured to the undercarriage and provided with an extensible element; a crank adapted to be pivotally mounted on said one end of the equipment adjacent said power means, said crank including an elongated shaft adapted to be pivotally mounted on said one end of the undercarriage, a pair of extensions secured to the shaft at opposed ends of the shaft and extending laterally therefrom in the same direction, in a projection extending laterally from the shaft intermediate said extensions and disposed angularly thereto; and linking structure pivotally interconnecting one end of the crank and said extensible means and the other end of the crank and said arms for swinging the latter upon extension of said element, to a position with said member engaging the ground below said one end of the undercarriage, said one end of the equipment lifted off the ground and supported on said assembly, and the member clearing the boom when the latter is swung downwardly over the member to a location proximal to said one end of the undercarriage.

3. Apparatus as set forth in claim 2 wherein said projection is pivotally connected to said element and wherein there is provided link means pivotally interconnecting each of said extensions respectively and a corresponding arm.

4. Apparatus as set forth in claim 3 wherein the angle between said projection and the extensions is approximately 120°.

5. Apparatus as set forth in claim 3 wherein said projection and the element are disposed at substantially a right angle at the time the cross member initially engages the ground.

6. Apparatus as set forth in claim 3 wherein said cross member is substantially V-shaped in transverse cross section.

References Cited in the file of this patent

UNITED STATES PATENTS

| | | |
|---|---|---|
| 2,381,199 | Baker | Aug. 7, 1945 |
| 2,781,927 | Holopainen | Feb. 19, 1957 |
| 2,801,012 | Lederer | July 30, 1957 |